(12) United States Patent
Mayer

(10) Patent No.: US 7,936,881 B2
(45) Date of Patent: May 3, 2011

(54) METHOD AND SYSTEM FOR TRANSMITTING SIGNALING INFORMATION OVER A DATA TRANSPORT NETWORK

(75) Inventor: Michael Mayer, Ottawa (CA)

(73) Assignee: Nortel Networks Limited, St-Laurent, Quebec (CA)

( * ) Notice: Subject to any disclaimer, the term of this patent is extended or adjusted under 35 U.S.C. 154(b) by 1552 days.

(21) Appl. No.: 10/929,461

(22) Filed: Aug. 31, 2004

(65) Prior Publication Data

US 2006/0045273 A1 Mar. 2, 2006

(51) Int. Cl.
*H04L 9/00* (2006.01)
(52) U.S. Cl. ...................................... 380/277
(58) Field of Classification Search .................... 380/277
See application file for complete search history.

(56) References Cited

U.S. PATENT DOCUMENTS

| 5,706,348 A * | 1/1998 | Gray et al. ..................... 713/160 |
| 2001/0007127 A1* | 7/2001 | Staring ......................... 713/160 |
| 2002/0066013 A1* | 5/2002 | Relander et al. .............. 713/151 |
| 2002/0094084 A1* | 7/2002 | Wasilewski et al. .......... 380/241 |

* cited by examiner

*Primary Examiner* — Kambiz Zand
*Assistant Examiner* — Aubrey H Wyszynski

(57) ABSTRACT

A method for transmitting signaling information, such as cryptographic key synchronization information, over a data path of a network, the data path having an originating end and a terminating end. The method uses in-band signaling to transmit the signaling information from the originating end of the data path to the terminating end of the data path without consuming any bandwidth of the data path. More specifically, the method includes the steps of receiving user data to be transmitted over the data path and encrypting this user data with a cryptographic key, thereby generating cipher data. The method next includes processing the cipher data such that the cipher data includes the signaling information, and mapping the cipher data including the signaling information into a traffic unit for transmission over the data path.

27 Claims, 9 Drawing Sheets

METHOD AND SYSTEM FOR TRANSMITTING SIGNALING INFORMATION OVER A DATA TRANSPORT NETWORK

FIELD OF THE INVENTION

The present invention relates to the field of data transport networks. More specifically, it pertains to a method and system for transmitting signaling information, such as cryptographic key synchronization information, over a data transport network.

BACKGROUND OF THE INVENTION

Data encryption is commonly used within public and private optical transport networks, for providing security to data transmissions. The encryption and decryption of data transferred over the optical transport network requires the use of encryption equipment at both the originating and terminating ends of a data path.

A symmetric, key-based cryptography system ("cryptosystem") is a well-known form of data encryption/decryption that is typically applied within synchronous, fiber-optic-based transmission systems applying SONET (Synchronous Optical Network) technology. One of the reasons for its popularity is the enhanced security that it provides through the use of multiple different encryption keys, the encryption equipment at both ends of the data path using the same key sequence. However, the strength of a symmetric key-based cryptosystem gives rise to an important challenge when implementing such a data encryption system, notably ensuring accurate synchronization of the key sequences at each end of the data path. This synchronization of the key sequences is critical in order to ensure that the terminating end of the data path uses the correct key when decrypting an encrypted signal transmission.

Existing key synchronization methods rely on the use of out-of-band signaling to transmit synchronization information over the network. Thus, the key synchronization information is sent separately from the primary data being transmitted, outside of the bandwidth reserved for transmission of the primary data. Unfortunately, a separate, bandwidth-consuming channel is therefore required for the key synchronization information.

In the case of SONET-based transmission systems, current key synchronization methods provide for the transmission of the key synchronization information in the path overhead portion of the SONET frame, separate from the primary data transmitted in the payload portion of the frame. Unfortunately, the result of such methods is a non-standard use of SONET overhead, which ends up being used on a proprietary basis. This non-standard use of SONET overhead limits both network and equipment interoperability, and in some cases creates the requirement for expensive custom engineering of network connections. Furthermore, the provision of key synchronization information in the SONET path overhead is in effect an unfortunate advertisement of the use of encryption on the payload data.

The background information herein clearly shows that there exists a need in the industry to provide an improved method and system for transmitting signaling information, such as cryptographic key synchronization information, over a data transport network, such as an optical transport network.

SUMMARY OF THE INVENTION

In a first broad aspect, the present invention provides a method for transmitting signaling information, such as cryptographic key synchronization information, over a data path of a network, the data path having an originating end and a terminating end and being characterized by a bandwidth. The method includes using in-band signaling to transmit the signaling information from the originating end of the data path to the terminating end of the data path without consuming any of the bandwidth of the data path.

In a second broad aspect, the present invention provides a method for transmitting signaling information, such as cryptographic key synchronization information, over a data path of a network, the data path being operative to transport a plurality of traffic units, at least a subset of the plurality of traffic units including a payload data portion. The method includes transmitting the signaling information within the payload data portions of the traffic units.

In a specific, non-limiting example of implementation, an optical transport network implements a method for in-band transmission of cryptographic key synchronization information. Thus, the cryptographic key synchronization information is transmitted from originating end to terminating end of a data path within the user payload data, i.e. within the user data units or within the user data portions of the compound units, without consuming any bandwidth of the data path.

In a third broad aspect, the present invention provides a method for transmitting signaling information over a data path of a network. The method includes receiving user data to be transmitted over the data path and encrypting the user data with a cryptographic key, thereby generating cipher data. Next, the method includes the steps of processing the cipher data such that the cipher data includes the signaling information, mapping the cipher data including the signaling information into a traffic unit, and transmitting the traffic unit over the data path.

In a fourth broad aspect, the present invention provides a cryptography system for a data transport network. The cryptography system includes an input for receiving user data to be transported over the data transport network, an encryption module, a synchronization module and a mapping module. The encryption module is operative to encrypt the user data with a cryptographic key for generating cipher data. The synchronization module is operative to process the cipher data such that the cipher data includes signaling information. The mapping module is coupled to the synchronization module and is operative to map the cipher data including the signaling information into a traffic unit. The cryptography system also includes an output for releasing the traffic unit to the data transport network.

In a specific, non-limiting example of implementation, the processing performed on the cipher data in order to incorporate therein the signaling information includes encoding the cipher data by applying a non-separable cyclic code thereto. Furthermore, a predefined error pattern may be added to the encoded cipher, where this predefined error pattern is indicative of a specific signaling information, such as a switch of the cryptographic key since the previous encryption.

In a fifth broad aspect, the present invention provides a method for receiving signaling information over a data path of a network. The method includes receiving a traffic unit sent over the data path, the traffic unit including cipher data, the cipher data including signaling information. Next, the method includes the steps of extracting the cipher data from the traffic unit, processing the cipher data in order to extract therefrom the signaling information, and decrypting the cipher data on a basis of the extracted signaling information.

In a sixth broad aspect, the present invention provides a cryptography system for a data transport network. The cryptography system includes an input for receiving a traffic unit from the data transport network, the traffic unit including cipher data, the cipher data including signaling information. The cryptography system also includes a demapping module, a synchronization module and a decryption module. The demapping module is operative to extract the cipher data from the traffic unit. The synchronization module is operative to process the cipher data for extracting therefrom the signaling information. The decryption module is operative to decrypt the cipher data on a basis of the signaling information.

In a specific, non-limiting example of implementation, the processing performed on the cipher data in order to extract therefrom the signaling information includes detecting whether or not the cipher data includes a predefined error pattern by applying a non-separable cyclic code to the cipher data. This predefined error pattern is representative of a specific signaling information, such as the requirement to switch a particular cryptographic key prior to decrypting the cipher data.

BRIEF DESCRIPTION OF THE DRAWINGS

These and other features of the present invention will become apparent from the following detailed description, considered in connection with the accompanying drawings. It is to be understood, however, that the drawings are provided for purposes of illustration only and not as a definition of the boundaries of the invention, for which reference should be made to the appending claims.

DETAILED DESCRIPTION

Figure 1:
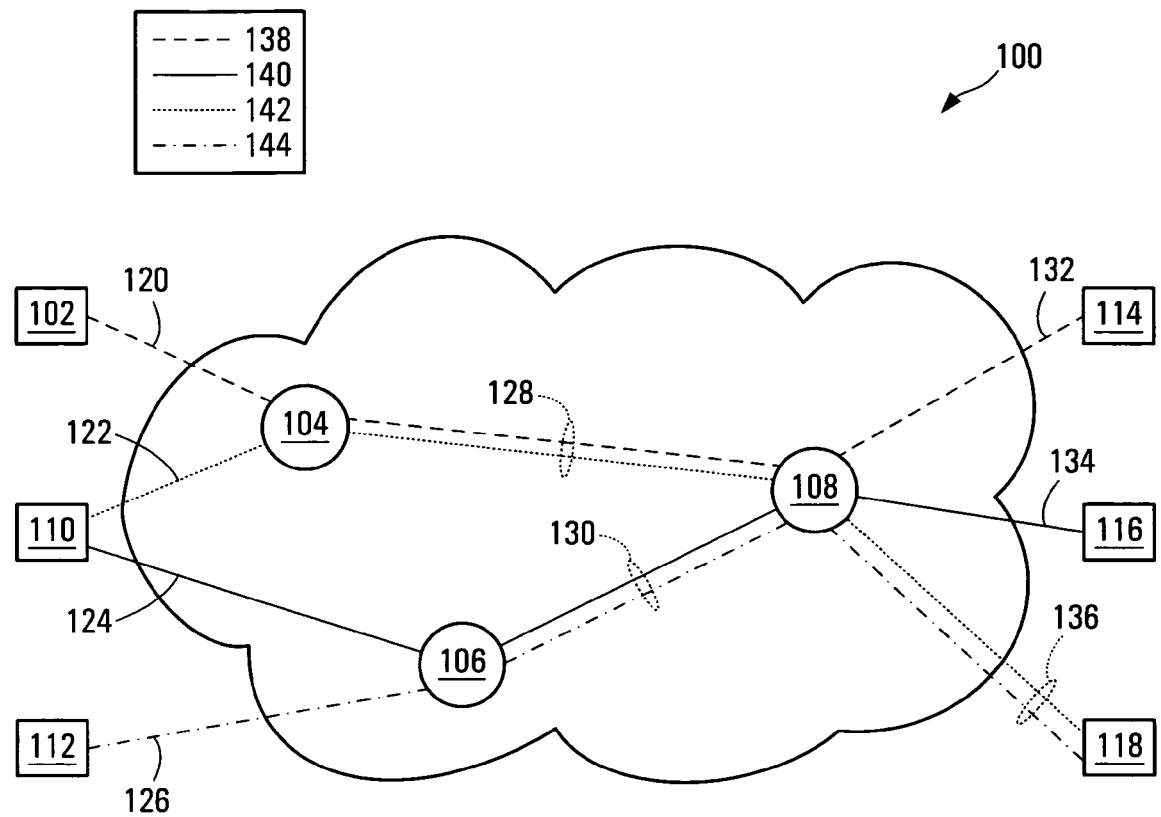
FIG. 1 illustrates an example of an optical transport network.

FIG. 1 illustrates an example of an optical transport network 100 formed of edge nodes 102, 110, 112, 114, 116, 118 and switching nodes 104, 106, 108, interconnected by physical communication links 120,122, 124,126,128,130,132, 134, 136. An edge node receives and buffers data in the electrical domain, converts the data to the optical domain and launches data into the optical transport network 100 under the control of a sending policy. In the reverse direction, an edge node receives data from the optical transport network 100, converts it back to the electrical domain and forwards it into an electrical network.

The switching nodes 104,106 and 108 are responsible for delivering the data to the correct destination within the optical transport network 100. Examples of possible switching nodes include optical space switches and electrical time switches, among other possibilities. It is not deemed necessary to discuss the structure and operation of these switching nodes in more detail, because it is well known to those skilled in the art and is not critical to the success of the invention.

The optical transport network 100 is managed as a mesh of trunks 138,140, 142 and 144. These trunks, also referred to as data paths, are virtual circuits built from a set of timeslots that is managed as a cohesive unit, originating at one edge node and terminating at another edge node. Note that the optical transport network 100 may also support multicast trunks. An edge node may originate and terminate many data paths and manages the allocation of the total bandwidth between the data paths as well as the time pattern of sending data units on each particular data path.

Note that, in the optical transport network 100, only one-to-one relationships (or paths) can be established between the edge nodes 102,110,112,114,116 and 118. For example, a unidirectional data path 138 connects edge node 102 to edge node 114 (102-to-114), while a unidirectional data path 144 connects edge node 112 to edge node 118 (112-to-118).

More complex relationships or topologies between edge nodes, such as bi-directional paths, one-to-many relationships or rings, are simply organized collections of one-to-one paths. For example, a bi-directional path between two edge nodes is treated as two, independent unidirectional paths. Thus, a bi-directional path between edge nodes 102 and 114 would be treated as a unidirectional path between edge node 102 and edge node 114 (102-to-114) and a separate unidirectional path between edge node 114 and edge node 102 (114-to-102). In another example, a one-to-many relationship between edge nodes is treated as multiple separate unidirectional data paths. Thus, the connections between edge node 110 and edge nodes 116 and 118 are treated as two separate unidirectional data paths, notably data path 140 (110-to-116) and data path 142 (110-to-118), respectively.

The data flowing through the optical network 100 is hereinafter referred to as "traffic units". These traffic units may be either user data units, control units or compound units having a user data portion and a control data portion. The user data units and the user data portions of the compound units carry mostly user payload data, such as speech samples, video samples or other. The control units and control data portions of the compound units carry control information, such as source and destination identifiers and control sequence numbers.

The optical transport network 100 implements a symmetric key-based cryptosystem, for providing security to data transmissions over the network 100. Thus, each edge node 102, 110, 112, 114, 116, 118 is capable to provide encryption of traffic units at the originating end of a data path and decryption of traffic units at the terminating end of a data path. Each edge node stores locally a plurality of different keys, where the particular key used to encrypt outgoing traffic units is periodically switched according to a predetermined key sequence. It should be noted that, within the optical transport network 100, all of the edge nodes 102, 110, 112, 114, 116, 118 store the same set of keys and switch keys according to the same predetermined key sequence, in accordance with the well-known principles of symmetric cryptosystems.

It should be noted that, within the optical transport network 100, each edge node 102, 110, 112, 114, 116, 118 applies the symmetric cryptosystem, and thus performs key synchronization, independently for each unidirectional data path originating at the respective edge node. Accordingly, when two or more different data paths terminate at the same edge node, key synchronization is performed independently and asynchronously for each different data path. The intricacies of building a symmetric cryptosystem and the related key synchronization operations into complex nodal topographies, such as one-to-many nodal relationships or rings, are well known to those skilled in the art and have been well documented, such that they will not be discussed in further detail herein.

Specific to the present invention, the optical transport network 100 implements a method for in-band transmission of signaling information, such as cryptographic key synchronization information. Thus, the signaling information is transmitted from originating end to terminating end of a data path within the user payload data, i.e. within the user data units or within the user data portions of the compound units. In the case of in-band transmission of cryptographic key synchronization information, this is in contrast to prior art cryptographic key synchronization methods, in which the key synchronization information is transmitted separately from the user payload data, and requires a separate bandwidth-consuming channel. The cryptographic key synchronization information serves to advise the terminating end of the data path whether or not a switch of the cryptographic key is required prior to decryption of the data transmission, thus synchronizing the encryption and decryption keys used at the originating and terminating ends, respectively.

Although the invention is set forth below in relation to the transmission of cryptographic key synchronization information over an optical transport network, it should be understood that the invention has a wider range of application. More specifically, various different types of low-frequency signaling information may be transmitted over an optical transport network using the method and system described herein, without departing from the scope of the present invention.

In a specific, non-limiting example of implementation of the present invention, the optical transport network 100 is synchronous and supports SONET technology. As such, each of edge nodes 102, 110, 112, 114, 116 and 118 may act as an end-point for a SONET path. Alternatively, the optical transport network 100 may support SDH or OTN technology, among other possibilities.

Current SONET standards support the transmission of OC-1, OC-3, OC-12, OC-48 and OC-192 optical signals. For the purposes of this specification, an OC-192 optical signal will be referred to as being characterized by a block size of 192. Similarly, an OC-48 optical signal is characterized by a block size of 48, while an OC-12 optical signal is characterized by a block size of 12. In one example, each edge node of the optical transport network 100 is adapted to receive an externally created OC-12 or OC-48 optical signal, and multiplex it into an OC-192 optical signal for transmission over the optical transport network 100. The OC-12 or OC-48 signal comes from an OC-12 or OC-48 system that receives electrical signals.

Since the optical transport network 100 is SONET-based, the traffic units carried by the network 100 take the form of optical signal blocks, which are compound units. More specifically, each optical signal block includes transport overhead and a synchronous payload envelope (SPE). The SPE itself includes a path overhead section and a payload section, the latter of which carries the user data. The transport overhead and path overhead sections of each optical signal block carry control data that allows for multiplexing, administration, maintenance and provisioning within the optical transport network 100, particularly helpful in inter-nodal communication. The composition of a SONET optical signal block has been well documented and is well known to those skilled in the art, such that it will not be described in further detail.

Figure 2:
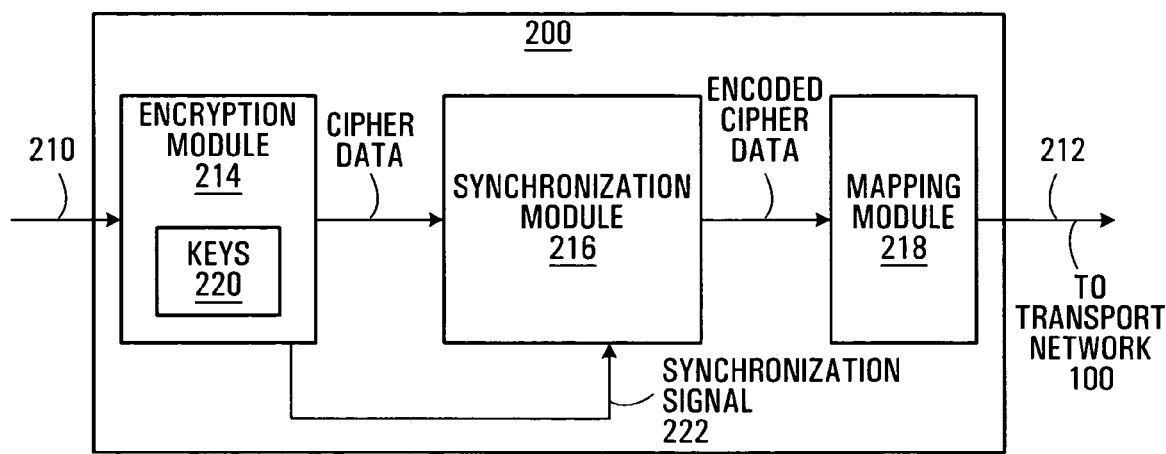
FIGS. 2 and 4 are functional block diagrams depicting a cryptography system implemented by the optical transport network of FIG. 1, in accordance with a non-limiting embodiment of the present invention.
Figure 4:
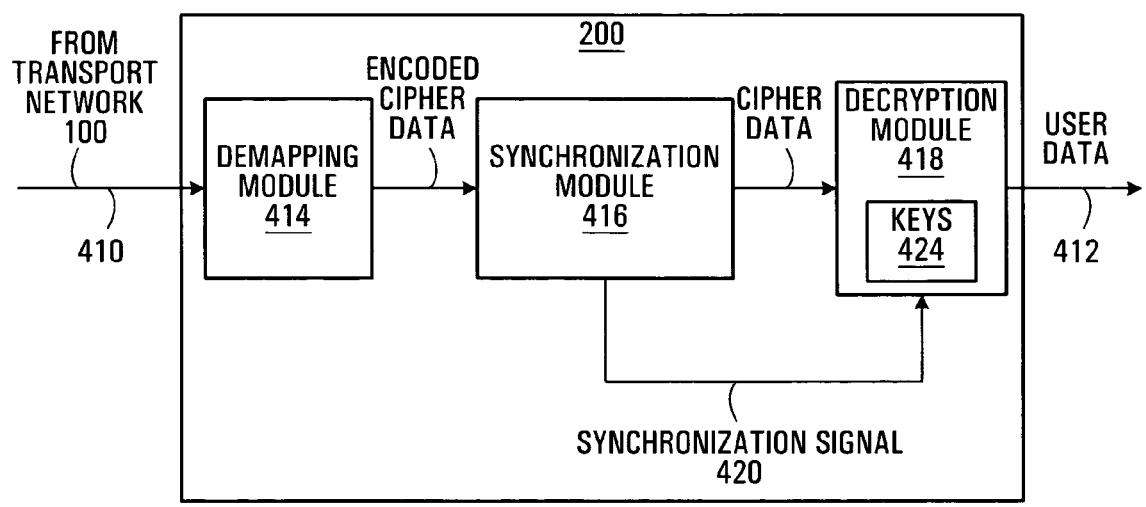

A functional block diagram of the cryptography system (also referred to herein as cryptosystem) implemented by the optical transport network 100 is illustrated in FIGS. 2 and 4, in accordance with a non-limiting embodiment of the present invention. For the sake of clarity, FIG. 2 presents the cryptosystem functionality from the perspective of the originating end of a particular data path of the optical transport network 100, while FIG. 4 presents the cryptosystem functionality from the perspective of the terminating end of the particular data path.

In FIG. 2, the symmetric cryptosystem 200 includes an input 210 for receiving user data to be transported over the optical transport network 100, as well as an output 212 for releasing traffic units to the data path of the network 100. The cryptosystem 200 further includes an encryption module 214, a synchronization module 216 and a mapping module 218, each of which will be discussed in further detail below.

Note that, although the cryptosystem according to the present invention is described herein below in the context of a SONET-based optical transport network, the cryptosystem may also be implemented within various different types of data transport networks, without departing from the scope of the present invention.

The encryption module 214 is operative to encrypt the user data received at input 210 with a predetermined cryptographic key, for generating cipher data that is output from the encryption module 214 to the synchronization module 216. Thus, the encryption module 214 processes the user data on the basis of the predetermined cryptographic key, in order to convert the user data into secure cipher data. Typically, a cryptographic key is an algorithm that is applied to the user data for rearranging the user data in order to render it unintelligible to unauthorized parties. In the case of digital signals, the cryptographic key normally acts to rearrange the data bits of the signal. Different cryptographic keys and encryption algorithms exist and may be applied by the encryption module 214, without departing from the scope of the present invention.

The encryption module 214 is provided with a set 220 of cryptographic keys. These keys are used in turn by the encryption module 214 to encrypt the user data, according to a predetermined key sequence. The predetermined key sequence defines the order of usage of the cryptographic keys by the encryption module 214, which will switch periodically from one cryptographic key to another. The concepts of key switching and using a key sequence within symmetric cryptosystems are well known to those skilled in the art, such that they will be not be discussed in further detail.

When a switch of the cryptographic key used by the encryption module 214 occurs, the encryption module 214 is operative to generate and transmit to the synchronization module 216 a key synchronization signal 222. The synchronization module 216 processes the cipher data received from the encryption module 214 on the basis of this key synchronization signal 222, as will be discussed in further detail below.

The synchronization module 216 is operative to process the cipher data received from the encryption module 214, for incorporating cryptographic key synchronization information into the cipher data. As discussed above, the cryptographic key synchronization information indicates whether or not the key used by encryption module 214 to generate the cipher data has been switched since a previous encryption. The synchronization module 216 is responsive to the key synchronization signal 222 issued by the encryption module 214 to process the next cipher data received from the encryption module 214 such that it indicates the occurrence of a switch of the cryptographic key. If the synchronization module 216 receives cipher data from the encryption module 214 without first receiving the key synchronization signal 222, the synchronization module 216 will process the cipher data such that it indicates that no switch of the cryptographic key has occurred.

Figure 3:
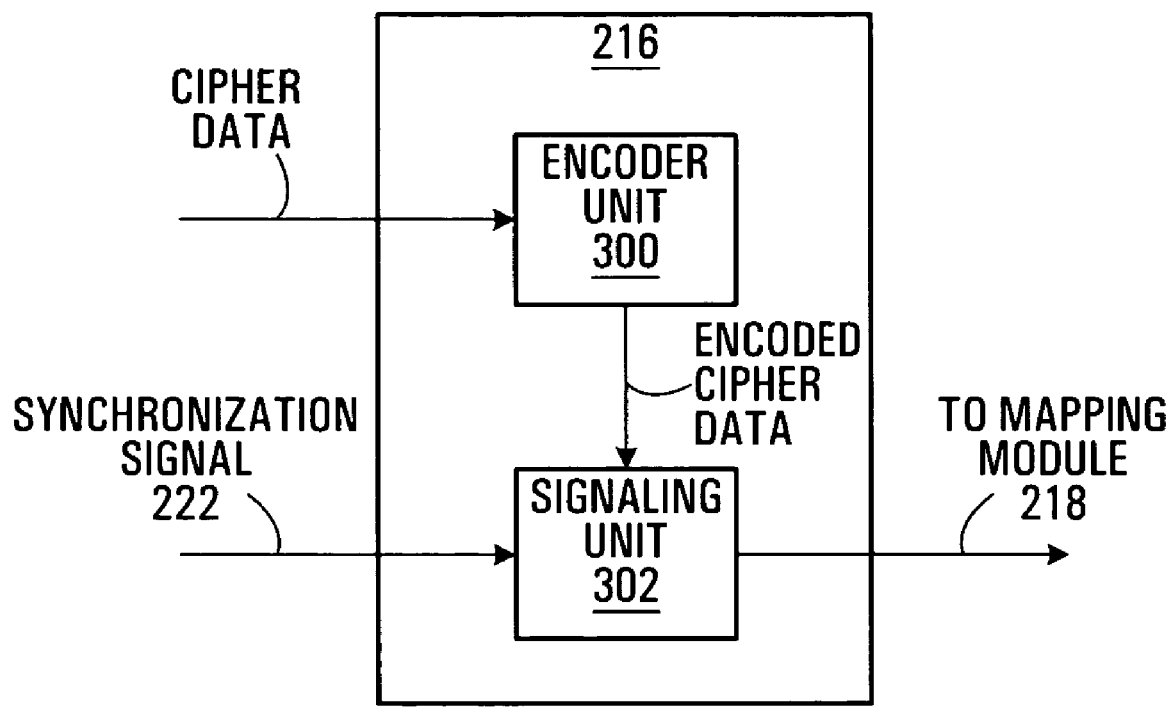
FIG. 3 is a functional block diagram depicting the synchronization module shown in FIG. 2, in accordance with a non-limiting embodiment of the present invention.

In a specific, non-limiting embodiment of the present invention, the synchronization module 216 includes an encoder unit 300 and a signaling unit 302, as shown in FIG. 3. The encoder unit 300 is operative to encode the cipher data received from the encryption module 214 by applying a non-separable cyclic code thereto. Encoding by non-separable cyclic code is a well-known form of encoding that uses polynomial mathematics to convert data, in this case the cipher data, into codewords, where these codewords are integrated with the data during conversion. Basically, a cyclic code is a linear block code (n, k), where k is the number of bits of data that are encoded and n is the length of the resulting codeword, with the property that every cyclic shift of a codeword results in another codeword. Cyclic code-based encoding, which is particularly renowned for its effectiveness for error detection and correction, has been well documented and is well known to those skilled in the art, such that it will not be described in further detail herein.

Note that different types of non-separable cyclic codes exist and may be applied by the encoder unit 214 without departing from the scope of the present invention.

The signaling unit 302 is responsive to the receipt or non-receipt of the key synchronization signal 222 to ensure that the appropriate cryptographic key synchronization information is included in the encoded cipher data. As such, the signaling unit 302 is responsible for providing a signal to the terminating end of the data path over which the cipher data is to be transmitted as to whether or not a switch of the cryptographic key is required prior to decryption of the cipher data.

More specifically, upon receipt of the synchronization signal 222 from the encryption module 214, the signaling unit 302 is operative to add a predefined error pattern to the encoded cipher data, prior to passing the encoded-cipher data to the mapping module 218. This predefined error pattern is determined in accordance with the non-separable cyclic code used by the encoder unit 300 to encode the cipher data, since one of the features of an (n, k) cyclic code is its ability to detect all runs of adjacent bit errors shorter than (n–k) in the codeword. In a specific example, the application of the predefined error pattern to the encoded cipher data consists of the manipulation of two or more adjacent bits of the encoded cipher data, such that the binary values of these one or more bits are switched (i.e. from 0 to 1 or vice versa).

Thus, the predefined error pattern applied by the signaling unit 302 to the encoded cipher data is indicative of a switch of the cryptographic key used by the encryption module 214. The predefined error pattern is therefore also indicative of a requirement for the decryption module at the terminating end of the data path to switch its own cryptographic key prior to decrypting the cipher data, as will be discussed in further detail below.

Note that various different error patterns are possible and may be used by the signaling unit 302 without departing from the scope of the present invention. Furthermore, in a variant embodiment of the invention, the signaling unit 302 is operative to add to the encoded cipher data information other than just the cryptographic key synchronization information. In one example, the signaling unit 302 selects one of a plurality of different error patterns to add to the encoded cipher data, each error pattern being indicative not only of a switch of the cryptographic key, but also of the particular new key to be used, thus allowing for non-sequential key sequencing. In another example, the signaling unit 302 is operative to add to the encoded cipher data a first predefined error pattern indicative of a switch of the cryptographic key and a second predefined error pattern indicative of the new key to be used. In yet another example, the signaling unit 302 is operative to add to the encoded cipher data the predefined error pattern indicative of a switch of the cryptographic key, as well as a pointer indicative of a new point in the cryptographic key list to switch to prior to decrypting the cipher data. This last example would be useful for non-sequential key switching, as well as for the case where two or more key switches had occurred since the last data transmission over a particular data path.

If the signaling unit 302 does not receive the synchronization signal 222 from the encryption module 214, the signaling unit 302 is operative to allow the encoded cipher data received from the encoder unit 300 to pass directly to the mapping module 218, without applying the predefined error pattern thereto. As such, the signaling unit 302 uses the lack of the predefined error pattern within the encoded cipher data to indicate that no switch of the cryptographic key used by the encryption module 214 has occurred since the previous encryption operation. The lack of the predefined error pattern within the encoded cipher data is therefore also indicative of the fact that the decryption module at the terminating end of the data path is not required to switch its own cryptographic key prior to decrypting the cipher data, as will be discussed in further detail below.

The mapping module 218 is operative to map the encoded cipher data into a traffic unit, for transmission over the optical transport network 100. More specifically, the mapping module 218 applies standard SONET processing to map the encoded cipher data into the payload section of a standard SONET SPE, and to add all necessary control data, including path and transport overhead. The mapping module 218 then transmits the generated optical signal block over the designated data path of the optical transport network 100. The standard SONET processing applied by the mapping module 218 also includes the calculation and addition of a parity code (BIP-8) to the transport overhead, where this parity code will be used at the terminating end of the data path over which the optical signal block is transmitted in order to check for transmission errors. Since standard SONET processing, including the concept of using a parity code in the transport overhead, has been well documented and is well known to those skilled in the art, it will not be described in further detail.

Note that, when the signaling unit 302 of the synchronization module 216 adds the predefined error pattern to the encoded cipher data prior to releasing the encoded cipher data to the mapping module 218, this predefined error pattern is inserted in the encoded cipher data prior to the calculation of the parity code by the mapping module 218. As such, the presence of the predefined error pattern within the payload section of the SPE is invisible to all network elements during transmission of the optical signal block over the data path of the optical transport network 100.

Advantageously, since the cyclic code applied to the cipher data by the encoder unit 300 is non-separable, the codewords generated by the encoder unit 300, as well as the error pattern applied by the signaling unit 302, are integrated with the cipher data, such that key synchronization occurs "in-band" without having to rob any payload bits from the SONET SPE. Thus, transmission of the key synchronization information does not consume any transport bandwidth of the data channel.

Although the cryptosystem functionality has been described above from the perspective of the originating end of a particular data path of an edge node, it should be clear that this same cryptosystem functionality is applied independently to each different data path originating at the same edge node. In a specific example, the same set of keys and predetermined key sequence, as well as the same starting point within the key sequence, are used by the encryption module 214 regardless of the particular data path over which the user data is to be transmitted. Alternatively, the encryption module 214 uses the same set of keys and predetermined key sequence for all of the different data paths originating at the edge node, but uses a different starting point within the key sequence for each data path. In yet another alternative, the encryption module 214 is provided with a different set of keys or a different key sequence for each different data path originating at the edge node. The latter scenario is much more complicated to set up and maintain, since each edge node within the optical network 100 must be provided with the appropriate sets of keys and key sequences, depending on the different data paths originating and terminating at the respective edge node.

As mentioned above, FIG. 4 is a block diagram illustrating the functionality of the cryptosystem from the perspective of the terminating end of the particular data path.

In FIG. 4, the symmetric cryptosystem 200 includes an input 410 for receiving a traffic unit in the form of a SONET optical signal block from the data path of the optical transport network 100, as well as an output 412 for releasing user data. The cryptosystem 200 further includes a demapping module 414, a synchronization module 416 and a decryption module 418, each of which will be discussed in further detail below.

The demapping module 414 is operative to apply standard SONET processing to the received optical signal block, in order to extract therefrom the contents of the payload section of the SPE, as well as the control data, including path and transport overhead. The standard SONET processing applied by the demapping module 414 also includes a verification of the parity code, or more specifically of the BIP-8 count, in order to check for transmission errors caused by the transmission facility. Since standard SONET processing, including the concept of identifying transmission errors on the basis of the BIP-8 count in the transport overhead, has been well documented and is well known to those skilled in the art, it will not be described in further detail.

Preferably, the symmetric cryptosystem 200 is robust to transmission errors, which are typically quite rare, for example in the order of 1 in 10E10 bits or more. More specifically, if the verification of the BIP-8 count reveals the presence of errors due to the transmission facility, the cryptosystem 200 is operative to apply one or more of different possible reliability or redundancy schemes/tests in order to ensure an accurate decryption of the cipher data of the SPE. Since this treatment of transmission errors is common to existing symmetric cryptosystems, and thus is well known to those skilled in the art, it will not be discussed in further detail herein. It should be noted however that the presence of transmission errors within the optical signal block may affect the ability to accurately interpret key synchronization information contained in the payload section of the SPE, as will be discussed in more detail below.

The payload data extracted by the de-mapping module 414, which consists of encoded cipher data, is passed to the synchronization module 416. The synchronization module 416 is operative to process the encoded cipher data received from the demapping module 414, for extracting therefrom the cryptographic key synchronization information. As discussed above, the cryptographic key synchronization information indicates whether or not the decryption module 416 must switch keys prior to decrypting the cipher data.

Figure 5:
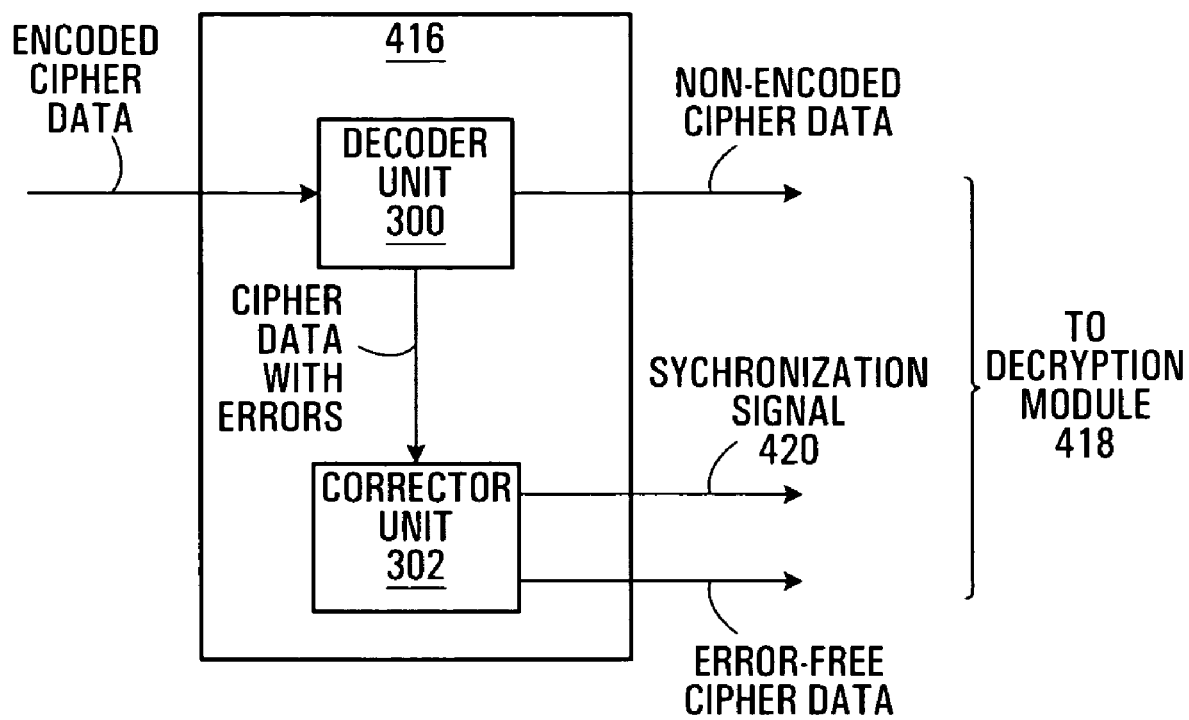
FIG. 5 is a functional block diagram depicting the synchronization module shown in FIG. 4, in accordance with a non-limiting embodiment of the present invention.

In a specific, non-limiting embodiment of the present invention, the synchronization module 416 includes a decoder unit 500 and a corrector unit 502, as shown in FIG. 5. The decoder unit 500 is operative to decode the encoded cipher data received from the demapping module 414, by re-applying to the encoded cipher data the same non-separable cyclic code used to encode the original cipher data. In addition to revealing non-encoded cipher data, the decoder unit 500 is also operative to detect the presence or absence of errors within the cipher data, as a result of the above-described error detection capability of cyclic code encoding/decoding. This error detection capability of cyclic code encoding/decoding has been well documented and is well known to those skilled in the art, such that it will not be described in further detail herein.

As mentioned above, it is possible that transmission errors caused by the transmission facility may invalidate the cryptographic key synchronization information contained in the SPE. Specific to the above embodiment of the present invention, transmission errors may hinder the ability of the decoder unit 500 to detect the presence or absence of errors within the decoded cipher data. Accordingly, in a non-limiting example of implementation, the synchronization module 416 implements a reliability test for verifying the validity of the cryptographic key synchronization information. In one example, this reliability test is based on the BIP-8 count determined by the de-mapping module 414. More specifically, If the BIP-8 count exceeds the error pattern detected by the decoder unit 500 in the cipher data, the synchronization module 416 will infer a high probability of transmission error contamination within the key synchronization information, and will disregard the key synchronization information. If however the BIP-8 count is less than the error pattern detected by the decoder unit 500, the synchronization module will infer that the extracted key synchronization information is valid.

Alternatively, the reliability test implemented by the synchronization module 416 may be based on a majority vote scheme, where a valid synchronization event would be allowed to occur only after receiving X out of Y data blocks correctly. In yet another alternative, the predetermined error patterns applied to the encoded cipher data at the originating end of the data path in order to signal key synchronization are chosen such that they are sufficiently longer than expected transmission error patterns. The theory and application of these different types of reliability tests are well known to those skilled in the art, such that they will not be described in further detail herein. Note that although the reliability test to determine the validity of the key synchronization information in light of possible transmission errors has been described above as being implemented by the synchronization module 416, it may also be implemented by a dedicated test module or by any other module of the symmetric cryptosystem 200 at the terminating end of the data path, without departing from the scope of the present invention.

The presence or absence of errors within the cipher data, as detected by the decoder unit 500 upon re-applying the non-separable cyclic code to the encoded cipher data, together with a low probability of transmission error contamination, represents the cryptographic key synchronization information. More specifically, the presence of errors within the cipher data is indicative of a requirement to switch the cryptographic key prior to decrypting the cipher data, for synchronizing the decryption equipment at the terminating end of the data path with the encryption equipment at the originating end of the data path. On the other hand, the absence of errors within the cipher data is indicative of the fact that no switch of the cryptographic key is required, such that decryption of the cipher data may occur with the same cryptographic key as used for the previous decryption operation.

If, during re-application of the non-separable cyclic code to the encoded cipher data, the decoder unit 500 detects the absence of errors within the cipher data, the decoder unit 500 is operative to forward the cipher data directly to the decryption module 418. The latter is operative to decrypt the cipher data for generating user data, as will be discussed in further detail below.

If, during re-application of the non-separable cyclic code to the encoded cipher data, the decoder unit 500 detects the presence of errors within the cipher data, the decoder unit 500 is operative to pass the cipher data to the corrector unit 502. Upon receipt of the cipher data from the decoder unit 500, the corrector unit 502 is operative to generate a key synchronization signal 420 and transmit this key synchronization signal 420 to the decryption module 418. The key synchronization signal 420 acts as a trigger to cause the decryption module 418 to switch cryptographic keys, as will be discussed further below.

The corrector unit 502 is further operative to use the same predefined error pattern as added to the encoded cipher data at the originating end of the data path to correct the errors identified by the decoder unit 500. In a specific example, the corrector unit 502 restores error bits to their original binary value (i.e. switch from 0 to 1 or vice versa), on the basis of the predefined error pattern. Once the corrector unit 502 has restored all of the errors identified in the cipher data, the corrector unit 502 is operative to transmit the cipher data to the decryption module 418.

The decryption module 418 is operative to decrypt the cipher data received from the synchronization module 416 with a predetermined cryptographic key, for generating user data that is output from the decryption module 418 via output 412. Thus, the decryption module 418 processes the cipher data on the basis of the predetermined cryptographic key, in order to convert the cipher data into recognizable user data. Different cryptographic keys and decryption algorithms exist and may be applied by the decryption module 418, without departing from the scope of the present invention.

The decryption module 418 is provided with a set 424 of cryptographic keys, where this set is identical to the set of keys used by the encryption equipment at the originating end of the data path. These keys are used in turn by the decryption module 418 to decrypt the cipher data, according to the same predetermined key sequence as applied by the encryption equipment at the originating end of the data path.

The decryption module 418 is responsive to the key synchronization signal 420 issued by the corrector unit 502 of the synchronization module 416 to switch cryptographic keys prior to decrypting the cipher data. If the decryption module 418 receives cipher data from the synchronization module 416 without first receiving the key synchronization signal 420, the decryption module 418 will decrypt the cipher data using the same cryptographic key as used for the previous decryption operation.

Note that, in a variant embodiment of the present invention, the synchronization module 416 further includes a buffering unit (not shown), operative to interface between the decoder unit 500 and the decryption module 418. More specifically, when the decoder unit 500 detects the absence of errors within the cipher data, the decoder unit 500 is operative to forward the cipher data to the buffering unit rather than directly to the decryption module 418. The buffering unit is operative to temporarily store the cipher data, prior to forwarding the cipher data to the decryption module 418, in order to accommodate the additional processing time required by the corrector unit 502 when the decoder unit 500 detects errors within the cipher data.

Figure 6:
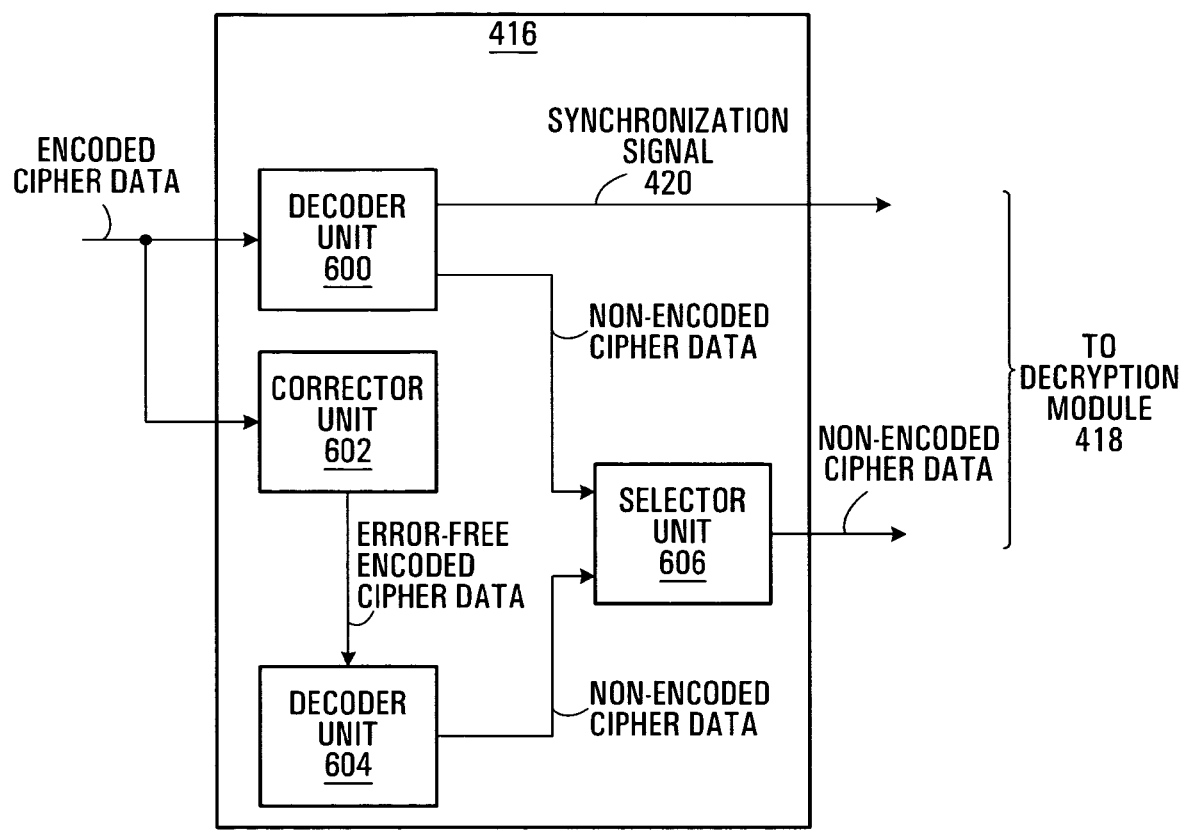
FIG. 6 is a functional block diagram depicting the synchronization module shown in FIG. 4, in accordance with a variant embodiment of the present invention.

In another variant embodiment of the present invention, the synchronization module 416 re-applies the non-separable cyclic code to the encoded cipher data twice, as illustrated by the functional block diagram shown in FIG. 6. In this example, the synchronization module 416 includes a first decoder unit 600, a corrector unit 602, a second decoder unit 604 and a selector unit 606.

The first decoder unit 600 receives as input the encoded cipher data output by the demapping module 414, and is operative to re-apply to the encoded cipher data the same non-separable cyclic code used to encode the original cipher data, in order to detect the presence or absence of errors within the cipher data. If, during re-application of the non-separable cyclic code to the encoded cipher data, the decoder unit 600 detects the absence of errors within the cipher data, the decoder unit 600 is operative to pass the non-encoded cipher data to the selector unit 606, as will be discussed below.

If, during re-application of the non-separable cyclic code to the encoded cipher data, the decoder unit 600 detects the presence of errors within the cipher data, the decoder unit 600 is operative to generate the key synchronization signal 420 and transmit this key synchronization signal 420 to the decryption module 418. Alternatively, the key synchronization signal 420 may be generated by the corrector unit 602.

The corrector unit 602 also receives as input the encoded cipher data output by the demapping module 414, and is operative to use the same predefined error pattern as added to the encoded cipher data at the originating end of the data path to identify and correct the errors within the encoded cipher data. Once the corrector unit 602 has restored all of the errors in the encoded cipher data, the corrector unit 602 is operative to pass the encoded cipher data to the second decoder unit 604.

The second decoder unit 604 is operative to re-apply the non-separable cyclic code to the encoded cipher data (as restored by the correction unit 602) in order to reveal the original, non-encoded cipher data. This non-encoded cipher data is then forwarded from the second decoder unit 604 to the selector unit 604, as will be discussed below.

The selector unit 604 receives the non-encoded cipher data output by each of the decoder units 600, 604. This selector unit 604 is operative to selectively couple one or the other of the decoder units 600, 604 to the decryption module 418, on the basis of the key synchronization signal 420 issued by the corrector unit 602. In a specific example, the selector unit by default couples the decoder unit 600 to the decryption module 418; however, upon receipt of the key synchronization signal 420 from the corrector unit 602, the selector unit performs a switch and couples the decoder unit 604 to the decryption module 418. The non-encoded cipher data output by the selector unit 606 is passed to the decryption module 418, where the cipher data is decrypted with the appropriate cryptographic key for generating the user data.

Although the cryptosystem functionality has been described above from the perspective of the terminating end of a particular data path of an edge node, it should be clear that this same cryptosystem functionality is applied independently to each different data path terminating at the same edge node. In a specific example, the same set of keys and predetermined key sequence, as well as the same starting point within the key sequence, are used by the decryption module 418 regardless of the particular data path over which the traffic unit is received. Alternatively, the decryption module 418 uses the same set of keys and predetermined key sequence for all of the different data paths terminating at the edge node, but uses a different starting point within the key sequence for each data path. In the latter case, the starting point used by the decryption module 418 for each particular data path is identical to that used by the encryption equipment at the originating end of the particular data path. In yet another alternative, the decryption module 418 is provided with a different set of keys or a different key sequence for each different data path terminating at the edge node.

In a specific example of implementation of the present invention, the cryptosystem 200 described above is implemented in each of the edge nodes 102, 110, 112, 114, 116 and 118. Note that when one of these edge nodes is involved in a data transmission over the optical transport network 100, the edge node may either originate or terminate the data transmission. Thus, the edge node may act either as the originating end of a data path of the optical transport network 100.or as the terminating end of a data path of the optical transport network 100.

Alternatively, the cryptosystem 200 may be implemented by standalone equipment, distinct from the edge nodes 102, 110, 112, 114, 116 and 118. In one example, the optical transport network 100 includes a plurality of standalone computing devices, each computing device being adapted specifically to implement the cryptosystem functionality described above. In this case, each computing device is coupled to a respective edge node, and acts as an interface between the respective edge node and the remaining network elements. In another example, the optical transport network 100 includes a single, standalone computing device adapted specifically to implement the cryptosystem functionality described above. In this case, the computing device is coupled to all of the edge nodes and provides cryptosystem functionality to each edge node, as required.

Figure 7:
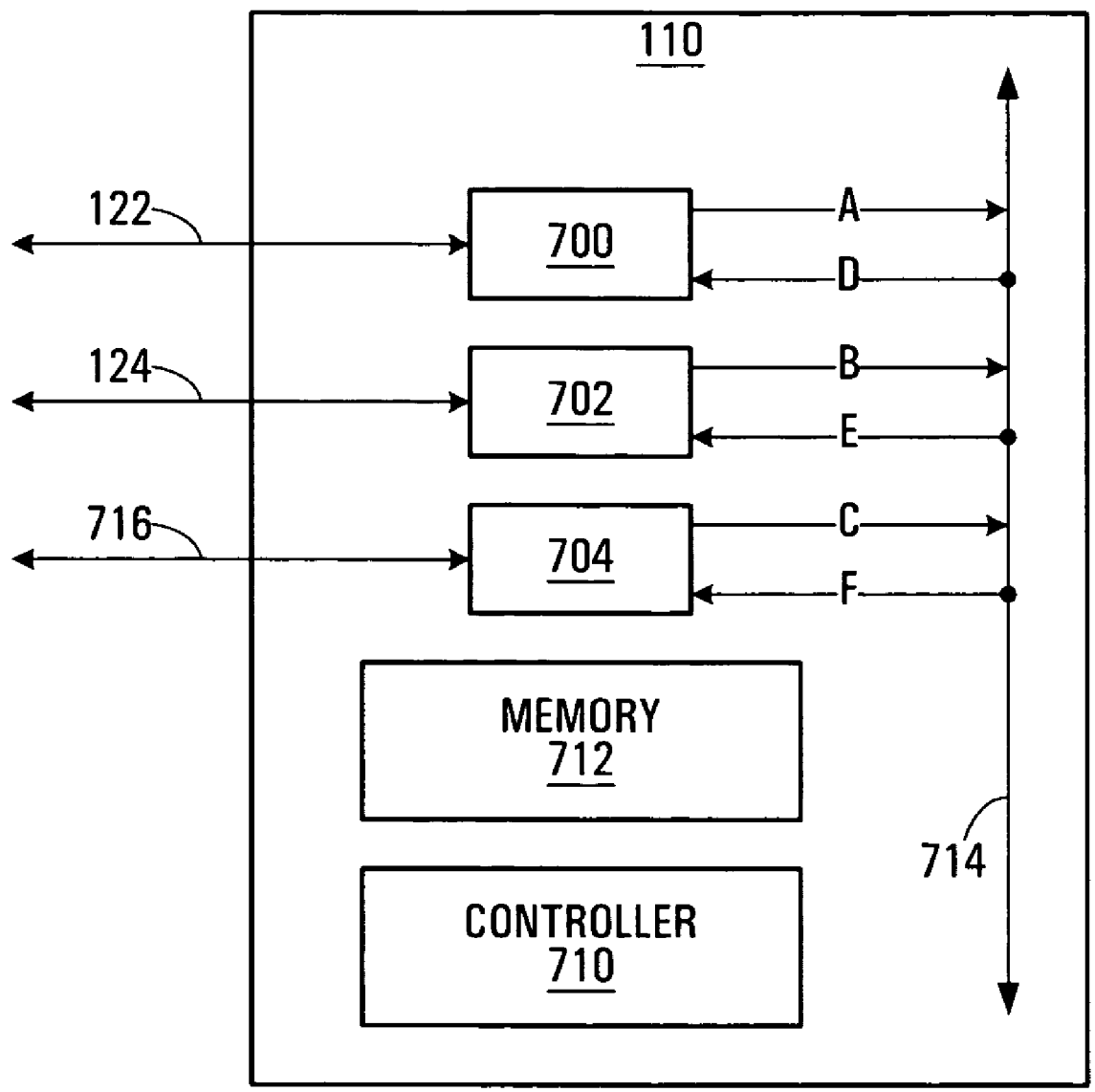
FIG. 7 is a structural block diagram of an example of an edge node of the optical transport network shown in FIG. 1.

A non-limiting example of the general structure of the edge nodes 102, 110, 112, 114, 116 and 118 is shown in FIG. 7, taking the example of edge node 110, which is comprised of interfaces 700, 702 and 704, a controller 710 and a memory 712. An internal system bus 714 interconnects these components, enabling data and control signals to be exchanged between them. The edge node 110 has 6 ports, identified as ports A through F. Four of these ports, specifically input ports A and B and output ports D and E, connect the edge node 110 to physical communication links 122 and 124, allowing data to be received from and passed to switching nodes 104 and 106, respectively. The remaining input port C and output port F connect the edge node 110 to physical communication link 716, allowing data to be exchanged with a local user or an external electrical network. In general, the input ports are designed to receive data from their associated physical paths, while the output ports are designed to transmit data over their associated physical paths.

The interfaces 700, 702 and 704 interconnect the various input and output ports to their respective physical communication paths. Interfaces 700, 702 are responsible for the conversion of incoming optical signals into electrical signals, as well as for the transmission of electrical signals to the internal system bus 714 for transport to the memory 712 where they can be processed by the controller 710. On the output side, the interfaces 700, 702 are also designed to accept outgoing electrical signals from the memory 712 through the system bus 714, and to convert these electrical signals into optical signals prior to their release into the optical transport network 100. Interface 704 is responsible for transmitting incoming electrical signals to the internal system bus 714 and, on the output side, for releasing outgoing electrical signals received from the memory 712 via the system bus 714 to the local user or external electrical network. It is not deemed necessary to discuss the standard functionality and operations of the interfaces 700, 702, 704 in more detail because it is well known to those skilled in the art and is not critical to the success of the invention.

Note that the interfaces 700 and 702 may implement at least in part the functionality of the mapping module 218 and the demapping module 414 as described above, including in particular the standard SONET processing operations.

Obviously, each edge node may be connected to more or less physical communication links, and thus have more or less input/output ports and interfaces, than shown in the example of FIGS. 1 and 7, without departing from the scope of the present invention. For example, edge node 110 may be connected to more than one physical communication link for exchanging data with a local user or an external electrical network.

The memory 712 contains a program element that controls the operation of the edge node 110. This program element is comprised of individual instructions that are executed by the controller 710 that is in the form of a Central Processing Unit (CPU). Specific to the present invention, and in accordance with a non-limiting example of implementation, the memory 712 stores a list of cryptographic keys for use during encryption and decryption operations, where the keys are arranged in the list according to a predetermined key sequence. This list includes at least two variable indicators, one of which identifies the particular key that is currently designated for encryption use, while the other identifies the particular key that is currently designated for decryption use. In the case where different starting points within the list of cryptographic keys are used for different data paths originating and terminating at the edge node 110, the list includes additional variable indicators, for indicating the currently designated encryption or decryption key for each data path. The memory 712 also stores at least one predefined error pattern, for use during encoding and decoding operations.

The memory 712 further holds a routing table that maps the destination addresses of incoming traffic units to the output ports D, E and F. It is not deemed necessary to further discuss the structure of the routing table here because this component is not critical to the success of the invention and also it would be well known to a person skilled in the technological field to which the present invention belongs. In addition, the memory 712 provides random access storage, capable of holding data elements that the controller 710 manipulates during the execution of the program. The execution of the program element by the controller 710 ensures both standard data transmission, transmission reliability testing and periodic cryptographic key switching, which functionality is well known to those skilled in the art and therefore will not be described in more detail.

Specific to the present invention, the execution of the program element stored in the memory 712 of edge node 110 further implements the functionality of cryptosystem 200, as will be discussed below. Note that the above structural description of an edge node has the purpose of presenting certain components of such a transmission node, and is in no way intended to limit the scope of the present invention to just these components.

Figure 8:
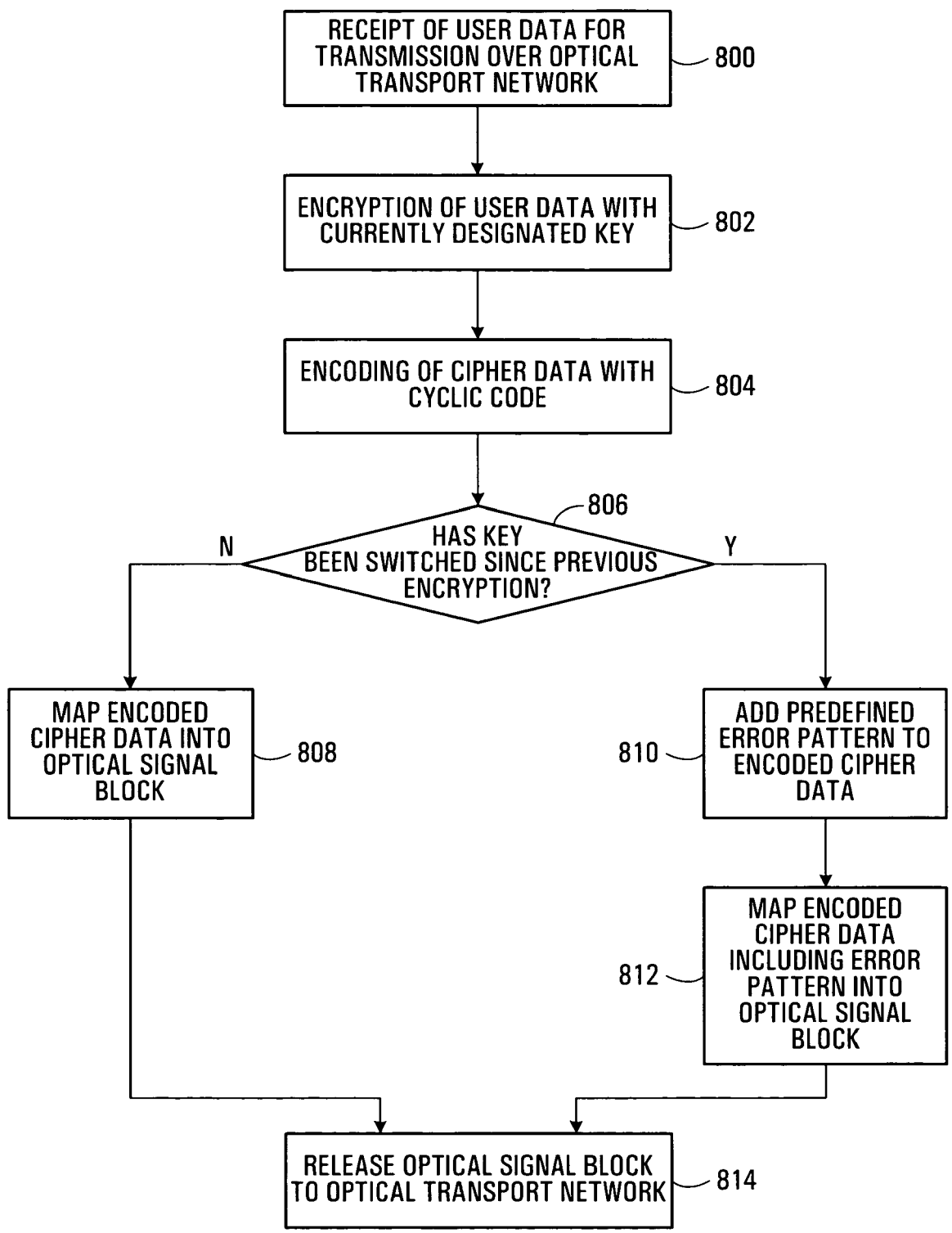
FIGS. 8 and 9 are flowcharts illustrating the operation of a program element in the edge node depicted in FIG. 7, which implements the cryptography system functionality.

FIG. 8 provides a complete flowchart illustrating an example of the operation of the program element stored in the memory 712, and executed by the controller 710, that regulates the operation of the edge node 110, in particular the cryptosystem functionality when the edge node 110 originates a data transmission over the optical transport network 100. At step 800, user data is received at the edge node 110 via physical communication link 716, where this user data is intended to be transmitted over the optical transport network 100, for example to edge node 114. At step 802, the received user data is encrypted using the cryptographic key currently designated for encryption operations, thereby generating cipher data. At step 804, the cipher data is encoded, by applying a non-separable cyclic code thereto. If the cryptographic key used to encrypt the user data has not changed since the previous encryption operation, the encoded cipher data is next mapped directly into a SONET optical signal block at step 808. If the cryptographic key used to encrypt the user data has been switched since the previous encryption operation, a predefined error pattern is added to the encoded cipher data at step 810, where this predefined error pattern is representative of the cryptographic key synchronization information. Next, the encoded cipher data including the predefined error pattern is mapped into a SONET optical signal block at step 812. The generated optical signal block is released to the optical transport network 100 at step 814, for transmission to edge node 114.

Figure 9:
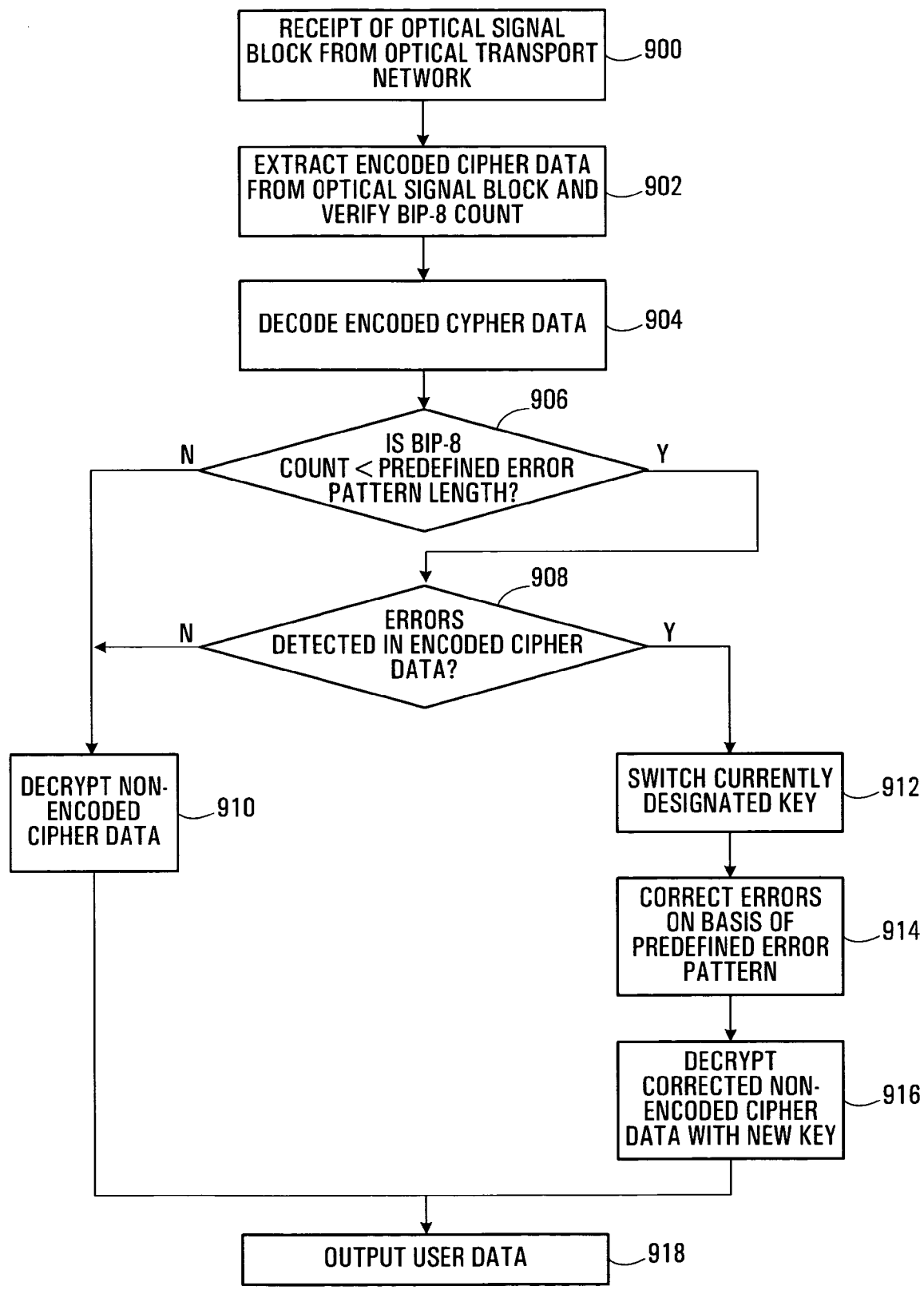

FIG. 9 provides a complete flowchart illustrating an example of the operation of the program element stored in the memory 712, and executed by the controller 710, that regulates the operation of the edge node 110, in particular the cryptosystem functionality when the edge node 110 receives a data transmission over the optical transport network 100. At step 900, the edge node 100 receives a SONET optical signal block from the optical transport network 100. At step 902, encoded cipher data is extracted from the payload section of the SPE and the BIP-8 count is verified in order to check for transmission errors. At step 904, the encoded cipher data is decoded, by re-applying to the encoded cipher data the same non-separable cyclic code as used to encode the original cipher data. If the BIP-8 count detected at step 902 is greater than the predefined error pattern added to the original encoded cipher data (i.e. cryptographic key synchronization information is likely invalid), the non-encoded cipher data is next decrypted at step 910, using the currently designated decryption key. If, on the other hand, the BIP-8 count is less than the predefined error pattern, a check is performed at step 908 in order to determine if any errors were detected in the encoded cipher data during application of the non-separable cyclic code. If the encoded cipher data is found to be free of errors, the non-encoded cipher data is next decrypted at step 910, using the same cryptographic key as used for the previous decryption operation. If, during application of the non-separable cyclic code to the encoded cipher data, errors are detected in the cipher data, the cryptographic key designated for decryption is switched at step 912, in accordance with the predetermined key sequence. At step 914, the errors detected in the cipher data are corrected on the basis of the same predefined error pattern as added to the original encoded cipher data, after which the non-encoded and corrected cipher data is decrypted at step 916. The decryption operation converts the cipher data into user data, which is output from the edge node 110 at step 918.

Note that the embodiments of the present invention described above should not be read in a limitative manner, as refinements and variations are possible without departing from the spirit of the invention. The scope of the invention is defined in the appended claims and their equivalents.

The invention claimed is:

1. A method for transmitting signaling information over a data path of a network, the data path having an originating end and a terminating end and being characterized by a bandwidth, said method comprising:
   receiving user payload data to be transmitted over the data path and output to a user; and
   processing the user payload data such that the user payload data is indicative of the signaling information, the signaling information being transmitted from the originating end of the data path to the terminating end of the data path without having to rob user payload data bits from the user payload data.

2. A method as defined in claim 1, wherein the signaling information is cryptographic key synchronization information.

3. A method for transmitting signaling information over a data path of a network, said method comprising:
   a) receiving user data to be transmitted over the data path and output to a user;
   b) encrypting the user data with a cryptographic key, thereby generating cipher data;
   c) processing the cipher data such that the cipher data is indicative of the signaling information, the cipher data indicative of the signaling information being decryptable into the user data;
   d) mapping the cipher data indicative of the signaling information into a traffic unit; and
   e) transmitting the traffic unit over the data path.

4. A method as defined in claim 3, wherein the signaling information is cryptographic key synchronization information.

5. A method as defined in claim 4, wherein the cryptographic key is one of a plurality of predetermined cryptographic keys, the cryptographic key synchronization information being indicative of whether or not a switch of the cryptographic key has occurred since a previous encryption.

6. A method as defined in claim 5, wherein said processing includes encoding the cipher data by applying a non-separable cyclic code thereto.

7. A method as defined in claim 6, wherein when the cryptographic key synchronization information is indicative of a switch of the cryptographic key since the previous encryption, said processing further includes modifying the encoded cipher data to be indicative of a predefined error pattern.

8. A method as claimed in claim 3, wherein the user data is one of speech data and video data.

9. A method for receiving signaling information over a data path of a network, said method comprising:
   a) receiving a traffic unit sent over the data path, the traffic unit including cipher data, the cipher data being an encrypted version of user data transmitted over the data path for output to a user, the cipher data being indicative of signaling information;
   b) extracting the cipher data from the traffic unit;
   c) processing the cipher data in order to extract therefrom the signaling information;
   d) decrypting the cipher data on a basis of the extracted signaling information to obtain the user data; and
   e) releasing the user data for output to the user.

10. A method as defined in claim 9, wherein the signaling information is cryptographic key synchronization information, said decrypting step including decrypting the cipher data with a particular cryptographic key on a basis of the extracted cryptographic key synchronization information.

11. A method as defined in claim 10, wherein the particular cryptographic key is one of a plurality of predetermined cryptographic keys, the cryptographic key synchronization information being indicative of whether or not a switch of the particular cryptographic key is required prior to decrypting the cipher data.

12. A method as defined in claim 11, wherein said processing includes detecting whether or not the cipher data includes a predefined error pattern by applying a non-separable cyclic code to the cipher data, said predefined error pattern being representative of a requirement to switch the particular cryptographic key prior to decrypting the cipher data.

13. A cryptography system for a data transport network, said cryptography system comprising:
   a) an input for receiving user data to be transported over the data transport network and output to a user;
   b) an encryption module operative to encrypt said user data with a cryptographic key for generating cipher data;
   c) a synchronization module operative to process said cipher data such that said cipher data is indicative of signaling information, the cipher data indicative of the signaling information being decryptable into the user data;
   d) a mapping module coupled to said synchronization module, said mapping module being operative to map said cipher data indicative of said signaling information into a traffic unit; and
   e) an output for releasing said traffic unit to the data transport network.

14. A system as defined in claim 13, wherein said signaling information is cryptographic key synchronization information.

15. A system as defined in claim 14, wherein said cryptographic key is one of a plurality of predetermined cryptographic keys available to said encryption module, said encryption module being operative to periodically switch said cryptographic key used to encrypt said user data, said cryptographic key synchronization information being indicative of whether or not a switch of said cryptographic key has occurred since a previous encryption by said encryption module.

16. A system as defined in claim 15, wherein said synchronization module includes an encoder unit operative to encode said cipher data by applying a non-separable cyclic code thereto.

17. A system as defined in claim 16, wherein said synchronization module is responsive to a switch of said cryptographic key by said encoder unit to modify said encoded cipher data to be indicative of a predefined error pattern, prior to releasing said encoded cipher data to said mapping module.

18. A system as claimed in claim 13, wherein the user data is one of speech data and video data.

19. A non-transistory computer readable storage medium containing a program element for execution by a computing apparatus to implement a cryptography system for a data transport network, said cryptography system including:
   a) an encryption module operative to encrypt user data with a cryptographic key for generating cipher data, said user data being intended for transmission over the data transport network to be output to a user;
   b) a synchronization module operative to process said cipher data such that said cipher data is indicative of signaling information, said cipher data indicative of said signaling information being decryptable into the user data; and
   c) a mapping module coupled to said synchronization module, said mapping module being operative to map said cipher data indicative of said signaling information into a traffic unit for transmission over the data transport network.

20. A cryptography system for a data transport network, said cryptography system comprising:
   a) an input for receiving user data to be transported over the data transport network and output to a user;
   b) an encryption module operative to encrypt said user data with a cryptographic key for generating cipher data;
   c) a synchronization module operative to process said cipher data such that said cipher data is indicative of cryptographic key synchronization information, said cipher data indicative of said cryptographic key synchronization information being decryptable into the user data;
   d) a mapping module coupled to said synchronization module, said mapping module being operative to map said cipher data indicative of said cryptographic key synchronization information into a traffic unit;
   e) an output for releasing said traffic unit to the data transport network.

21. A cryptography system for a data transport network, said cryptography system comprising:
   a) an input for receiving a traffic unit from the data transport network, said traffic unit including cipher data, said cipher data being an encrypted version of user data transmitted over the data transport network for output to a user, said cipher data being indicative of signaling information;
   b) a demapping module operative to extract said cipher data from said traffic unit;
   c) a synchronization module operative to process said cipher data for extracting therefrom said signaling information;
   d) a decryption module operative to decrypt said cipher data on a basis of said signaling information to obtain the user data; and
   e) an output for releasing the user data for output the user.

22. A system as defined in claim 21, wherein said signaling information is cryptographic key synchronization information, said decryption module being operative to decrypt said cipher data with a particular cryptographic key on a basis of said cryptographic key synchronization information.

23. A system as defined in claim 22, wherein said cryptographic key is one of a plurality of predetermined cryptographic keys available to said decryption module, said cryptographic key synchronization information being indicative of whether or not a switch of said cryptographic key is required prior to decrypting said cipher data.

24. A system as defined in claim 23, wherein said synchronization module includes a decoder unit operative to apply a non-separable cyclic code to said cipher data received from said demapping module, said decoder unit being capable to detect a predefined error pattern in said cipher data.

25. A system as defined in claim 24, wherein said synchronization module is responsive to the detection by said decoder unit of a predefined error pattern in said cipher data to cause said decryption module to switch said cryptographic key prior to decrypting said cipher data.

26. A non-transistory computer readable storage medium containing a program element for execution by a computing apparatus to implement a cryptography system for a data transport network, the data transport network transporting a plurality of traffic units, at least a subset of the traffic units including cipher data that is indicative of signaling information, the cipher data being an encrypted version of user data transmitted over the data transport network for output to a user, said cryptography system including:
   a) a demapping module operative to extract the cipher data from the traffic units including cipher data;

b) a synchronization module operative to process said cipher data for extracting therefrom said signaling information;

c) a decryption module operative to decrypt said cipher data on a basis of said signaling information to obtain the user data.

27. A cryptography system for a data transport network, said cryptography system comprising:

a) an input for receiving a traffic unit from the data transport network, said traffic unit including cipher data, said cipher data being an encrypted version of user data transmitted over the data transport network for output to a user, said cipher data being indicative of cryptographic key synchronization information;

b) a demapping module operative to extract said cipher data from said traffic unit;

c) a synchronization module operative to process said cipher data for extracting therefrom said cryptographic key synchronization information;

d) a decryption module operative to decrypt said cipher data with a particular cryptographic key on a basis of said cryptographic key synchronization information to obtain the user data; and e) an output for releasing the user data for output to the user.

* * * * *